United States Patent
Esposito et al.

(10) Patent No.: US 10,818,082 B2
(45) Date of Patent: Oct. 27, 2020

(54) METHOD AND SYSTEM FOR PARAMETRICALLY CREATING AN OPTIMAL THREE DIMENSIONAL BUILDING STRUCTURE

(71) Applicant: VIVACITY INC., San Juan, PR (US)

(72) Inventors: Matthew Esposito, Brooklyn, NY (US); Geraldine Esposito, Brooklyn, NY (US); Hector Tarrido-Picart, New York, NY (US)

(73) Assignee: VIVACITY INC., San Juan, PR (US)

( * ) Notice: Subject to any disclaimer, the term of this patent is extended or adjusted under 35 U.S.C. 154(b) by 0 days.

(21) Appl. No.: 16/288,297

(22) Filed: Feb. 28, 2019

(65) Prior Publication Data

US 2019/0272669 A1    Sep. 5, 2019

Related U.S. Application Data

(60) Provisional application No. 62/638,776, filed on Mar. 5, 2018, provisional application No. 62/638,774, filed on Mar. 5, 2018, provisional application No. 62/639,284, filed on Mar. 6, 2018.

(51) Int. Cl.
| | | |
|---|---|---|
| *G06T 17/00* | (2006.01) | |
| *G06N 3/04* | (2006.01) | |
| *G06Q 50/16* | (2012.01) | |
| *G06F 40/30* | (2020.01) | |
| *G06F 40/242* | (2020.01) | |
| *G06N 20/00* | (2019.01) | |

(52) U.S. Cl.
CPC ............ *G06T 17/00* (2013.01); *G06F 40/242* (2020.01); *G06F 40/30* (2020.01); *G06N 3/04* (2013.01); *G06Q 50/165* (2013.01); *G06N 20/00* (2019.01); *G06T 2210/04* (2013.01)

(58) Field of Classification Search
None
See application file for complete search history.

(56) References Cited

U.S. PATENT DOCUMENTS

| | | | |
|---|---|---|---|
| 2011/0055091 A1* | 3/2011 | Budlong | G06Q 10/00 705/313 |
| 2012/0290492 A1 | 11/2012 | Zabala Rodriguez | |
| 2013/0132041 A1 | 5/2013 | Sigaty et al. | |
| 2015/0220835 A1* | 8/2015 | Wilson | H04W 4/21 706/46 |
| 2015/0278280 A1 | 10/2015 | Ma et al. | |
| 2015/0324496 A1 | 11/2015 | Müller et al. | |
| 2016/0027020 A1* | 1/2016 | Peterson | G06Q 30/018 705/315 |

(Continued)

OTHER PUBLICATIONS

International Search Report dated May 13, 2019 from corresponding International (PCT) Application No. PCT/US2019/020676, 3 pages.

(Continued)

*Primary Examiner* — Jason A Pringle-Parker
(74) *Attorney, Agent, or Firm* — Hoglund & Pamias, PSC; Roberto J. Rios

(57) ABSTRACT

Given a parcel of land that is regulated by city zoning rules, the system and method described uses a combination of rule based coded and machine learning to parametrically create geometry for the maximum or optimal buildable envelope with the least amount of regulation.

16 Claims, 13 Drawing Sheets

(56) References Cited

U.S. PATENT DOCUMENTS

| | | |
|---|---|---|
| 2016/0110824 A1* | 4/2016 | Zabala Rodriguez ........................ G06Q 50/08 705/315 |
| 2016/0275209 A1 | 9/2016 | Kelly et al. |
| 2017/0011548 A1 | 1/2017 | Sigaty et al. |
| 2017/0132513 A1* | 5/2017 | Yu ............................ G06N 3/08 |

OTHER PUBLICATIONS

Written Opinion dated May 13, 2019 from corresponding International (PCT) Application No. PCT/US2019/020676, 14 pages.

Nicknam et al., "A Design Optimization Workflow for Tall Buildings Using Parametric Algorithm"; CTBUH 2011 Seoul Conference, Oct. 12, 2011, pp. 561-569. Retrieved on Apr. 22, 2019 from <http://global.ctbuh.org/resources/papers/download/872-a-design-optimization-workflow-for-tall-buildings-using-parametric-algorithm.pdf>.

PythonForBeginners. "String Concatenation and Formatting"; Dec. 9, 2012. Retrieved on Apr. 22, 2019 from <https://www.pythonforbeginners.com/concatenation/stroing-concatenation-and-formatting-in-python>. 5 pages.

Stavric et al., "Parametric modeling for advanced architecture". International Journal of Applied Mathematics and Informatics, Issue 1, vol. 4, Jan. 2011, retrieved on Apr. 22, 2019 from <https://parametric-architecture.com/wp-content/uploads/2018/09/PARAMETRIC-MODELING-FOR-ADVANCED-ARCHITECTURE.pdf>, pp. 9-16.

\* cited by examiner

Fig. 7D

| Parcel No. 1 | | | | | | | Report from 3D Geometry | | |
|---|---|---|---|---|---|---|---|---|---|
| Parameter | | | | | | | ZFA | YesCount | NoCount |
| Overlay | Special District | Community Facility | MixUse | Quality Housing | Inclusionary housing | Mandatory Inclusionary housing | | | |
| Y → | N | N | N | N → | N → | N → | 125,000 | 12 | 1 |
| Y | Y | N → | Y | N → | N → | N | 125,000 | 6 | 7 |
| N | N | N → | N | N → | N | Y | 150,000 | 9 | 4 |
| Y → | N → | N | N → | N → | Y → | N → | 300,000 | 7 | 6 |
| Y | Y | N | Y | N | Y | N | 325,000 | 7 | 6 |

(Table columns include: Air Rights, QualifyingFloor, AltSkyplane, SideYardOption, YardAlternative, Affordable Senior, Mandatory Inclusionary housing, Inclusionary housing, Quality Housing, MixUse, Community Facility, Special District, Overlay)

Rows (bottom labels): DNA_Solution_No.1, DNA_Solution_No.23, DNA_Solution_No.75, DNA_Solution_No.200, DNA_OptimalSolution_No.500

Parcel No. 100

| Report from 3D Geometry | DNA_Solution No.1 | DNA_Solution No.23 | DNA_Solution No.75 | DNA_OptimalSolution No.100 | DNA_Solution No.500 |
|---|---|---|---|---|---|
| ZFA | 125,000 | 125,000 | 300,000 | 325,000 | |
| YesCount | 12 | 5 | 9 | 7 | |
| NoCount | 1 | 7 | 4 | 6 | |

| Parameter | DNA_Solution No.1 | DNA_Solution No.23 | DNA_Solution No.75 | DNA_OptimalSolution No.100 | DNA_Solution No.500 |
|---|---|---|---|---|---|
| Air Rights | N | Y | N → | N | |
| QualifyingFloor | N → | N | N → | N | |
| AltSkyplane | N | Y | Y → | Y | |
| SideYardOption | N | Y | Y → | Y | |
| YardAlternative | N | Y | Y → | Y | |
| Affordable Senior | N → | N | Y | N | |
| Mandatory InclusionaryHousing | N → | N | Y | N | |
| InclusionaryHousing | N → | N → | Y → | Y | |
| Quality Housing | N → | N → | N → | N | |
| MixUse | N | Y | Y → | Y | |
| Community Facility | N | N → | N → | N | |
| Special District | N | Y | Y → | Y | |
| Overlay | Y → | Y | Y → | Y | |

| Parcel No. 300 | | DNA_Solution_No1 | DNA_OptimalSolution_No.23 | DNA_Solution_No.75 | DNA_Solution_No.100 | DNA_Solution_No.500 |
|---|---|---|---|---|---|---|
| Report from 3D Geometry | ZFA | 125,000 | 350,000 | 220,000 | 220,000 | 200,000 |
| | YesCount | 12 | 6 | 3 | 7 | 7 |
| | NoCount | 3 | 7 | 4 | 5 | 5 |
| Parameter | Air Rights | Y → Y | | Y | Y | Y |
| | QualifyingFloor | N → N | | Y | N | Y |
| | AltSkyplane | Y → Y | | Y | Y | Y |
| | SideYardOption | N | Y | Y | Y | Y |
| | YardAlternative | N | Y | Y | N | N |
| | Affordable Senior | N → N | | N | N | N |
| | Mandatory Inclusionary Housing | N → N | | N | N | N |
| | Inclusionary Housing | N | Y | Y | Y | Y |
| | Quality Housing | N → N | | N | N | N |
| | MixUse | N → N | | Y | Y | Y |
| | Community Facility | N → N | | N | N | Y |
| | Special District | Y → Y | | Y | Y | Y |
| | Overlay | Y → Y | | Y | Y | Y |

Fig. 8C

METHOD AND SYSTEM FOR PARAMETRICALLY CREATING AN OPTIMAL THREE DIMENSIONAL BUILDING STRUCTURE

This application claims priority from and the benefit of provisional patent application Ser. No. 62/638,776, filed on Mar. 5, 2018; Ser. No. 62/638,774 filed on Mar. 5, 2018, and Ser. No. 62/639,284, filed on Mar. 6, 2018 the entire contents of which are incorporated herein by reference, for all purposes.

BACKGROUND OF THE DISCLOSURE

1. Field of the Disclosure

The present disclosure relates to a system and a method for determining the optimal building that meets the zoning code for a parcel of land. It is also related to such system and method that can be used to provide a building plan for an entire city or a portion thereof.

2. Description of the Related Art

In parcels of lands that are regulated by city urban planning departments, it is often difficult to understand how a zoning legal text directly impacts what can be legally built. This process often requires a lawyer, an architect, a real estate developer and an urban planner to correctly interpret the zoning legal text. The application of the zoning text to real parcels is further complicated by the geometric reality of the parcel of land, which often does not align with the ideal conditions described in the zoning text, and by incentives and exceptions that cities allow to indirectly encourage specific outcomes. In addition, a real estate developer is usually looking for the best optimal solution that maximizes the potential development in a parcel of land. The optimal solution often hinges upon various factors that include reduction of regulations from zoning text, maximum height of development, maximum square footage of the development, and building use diversity. This leaves the team of architects, real estate developers, and urban planners with a solution matrix that is often large and complicated to navigate for any parcel. As a result, the entire process from interpreting the zoning text to understanding how the zoning text impacts a single parcel often takes between two and four months to complete.

SUMMARY OF THE DISCLOSURE

There is a need for a system and a method that can streamline the process of interpreting the zoning codes and designing a building or buildings that meet such codes.

In general, an embodiment of the disclosure is directed to streamlining the entire process of potential development through a rule-based and automated approach. The legal interpretation of the zoning code parses it into two machine readable texts. First is the creation of a set computer rules using the language of Computer Generated Architecture (CGA) in City Engine for the manipulation of 3D geometry following what is stipulated by the zoning text. The second is the transformation of the parameters that drive the zoning text (such as maximum height, setback from street, backyards and sideboards, skyline penetration planes, floor heights, etc.) into machine readable text. An automaton is run and trained using a script written in Python in CityEngine to run through all variables that exist in a parcel. The automaton searches for the optimal solution per parcel that most closely aligns with real estate trends and stores categorization for the optimal solution in a Tensorflow node. This entire process takes about three minutes to complete for a parcel. Successive parcels are run, and an entire city, or portion thereof, can be planned.

In particular, the disclosure herein is directed to a computerized method for parametrically creating a buildable envelope on a parcel of land, comprising obtaining zoning information for a city; storing the information in a database; using information in the database on a platform for rule based modeling to generate a virtual three dimensional development solution on the parcel of land that follows the logic of a zoning code designation; establishing a pool of the full number of development solutions for each parcel that meets the zoning code; querying the pool of solutions to find an optimal development solution; storing a concatenated string for attributes applied to the parcel, and storing as an evolutionary node in a neural network the zoning designation for the parcel, attributes applied to the parcel, the classification of the parcel and a report of the optimal development solution with original attributes.

Thus, the process disclosed herein is automated, so that an automation, rather than a human being, searches for the optimal solution per parcel, based on the zoning requirements. The automation learns from past discovery phases to optimize searching for future solutions as it moves from parcel to parcel by accessing past categorizations of parcels in the Tensorflow node network. The system and method can be used for a parcel of land, or to plan a portion of a city, or an entire city.

The disclosure is also directed to a computerized system for parametrically creating a buildable envelope on a parcel of land comprising a processor; a memory containing instructions for causing the processor to execute the method disclosed above.

Another embodiment of the disclosure is directed to a computer readable non-transitory storage medium storing instructions of a computer program which when executed by a computer system results in performance of steps of the method disclosed herein.

BRIEF DESCRIPTION OF THE DRAWINGS

Figure 7D:
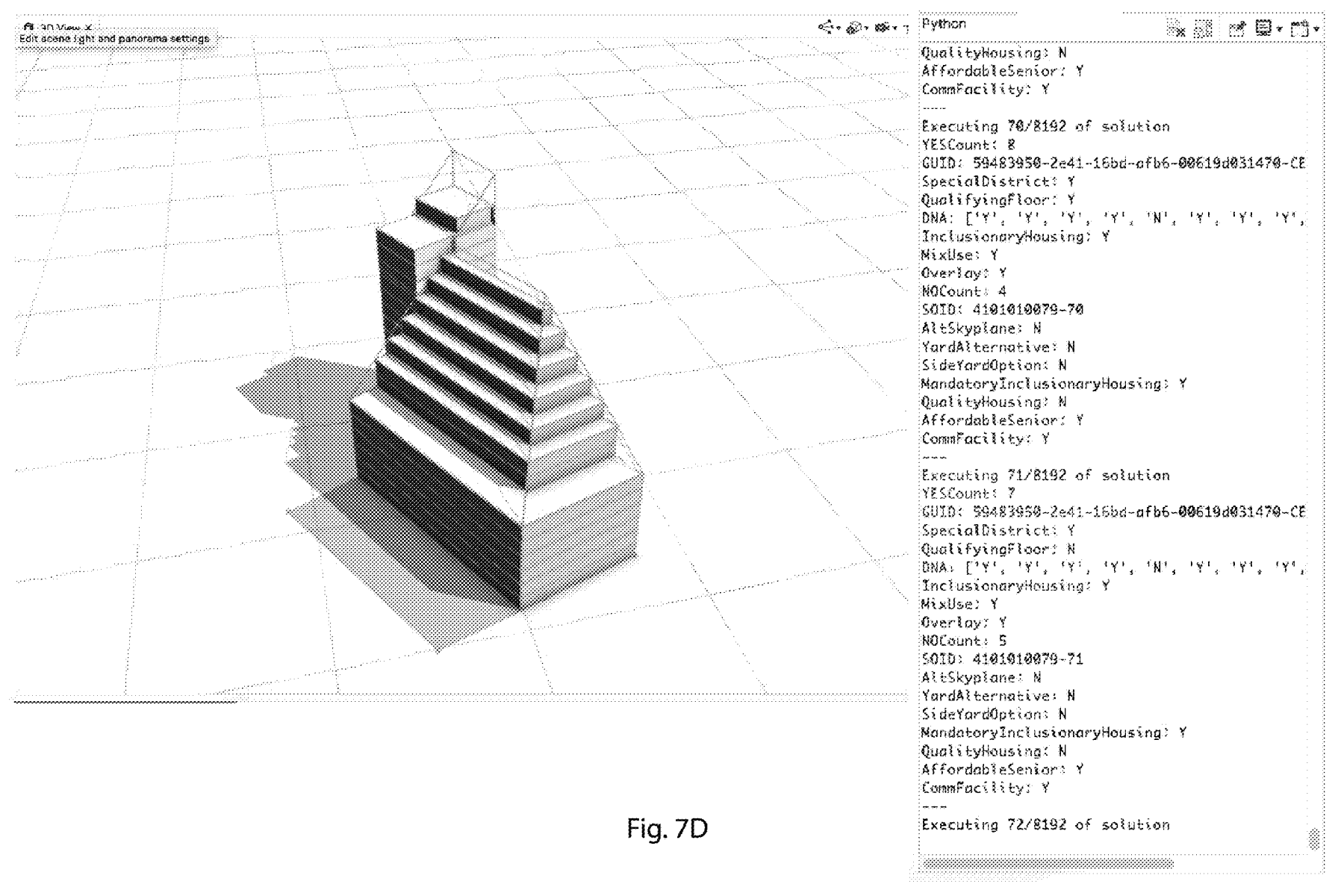

FIGS. 7A, 7B, 7C and 7D are examples of successive building shapes computed in accordance with the embodiment described herein to arrive at an optimal solution for a given parcel of land.

FIGS. 8A, 8B and 8C are examples of so called "parcel DNA' for three parcels of land.

A component or a feature that is common to more than one drawing is indicated with the same reference number in each of the drawings.

DESCRIPTION OF THE EMBODIMENTS

Figure 1:
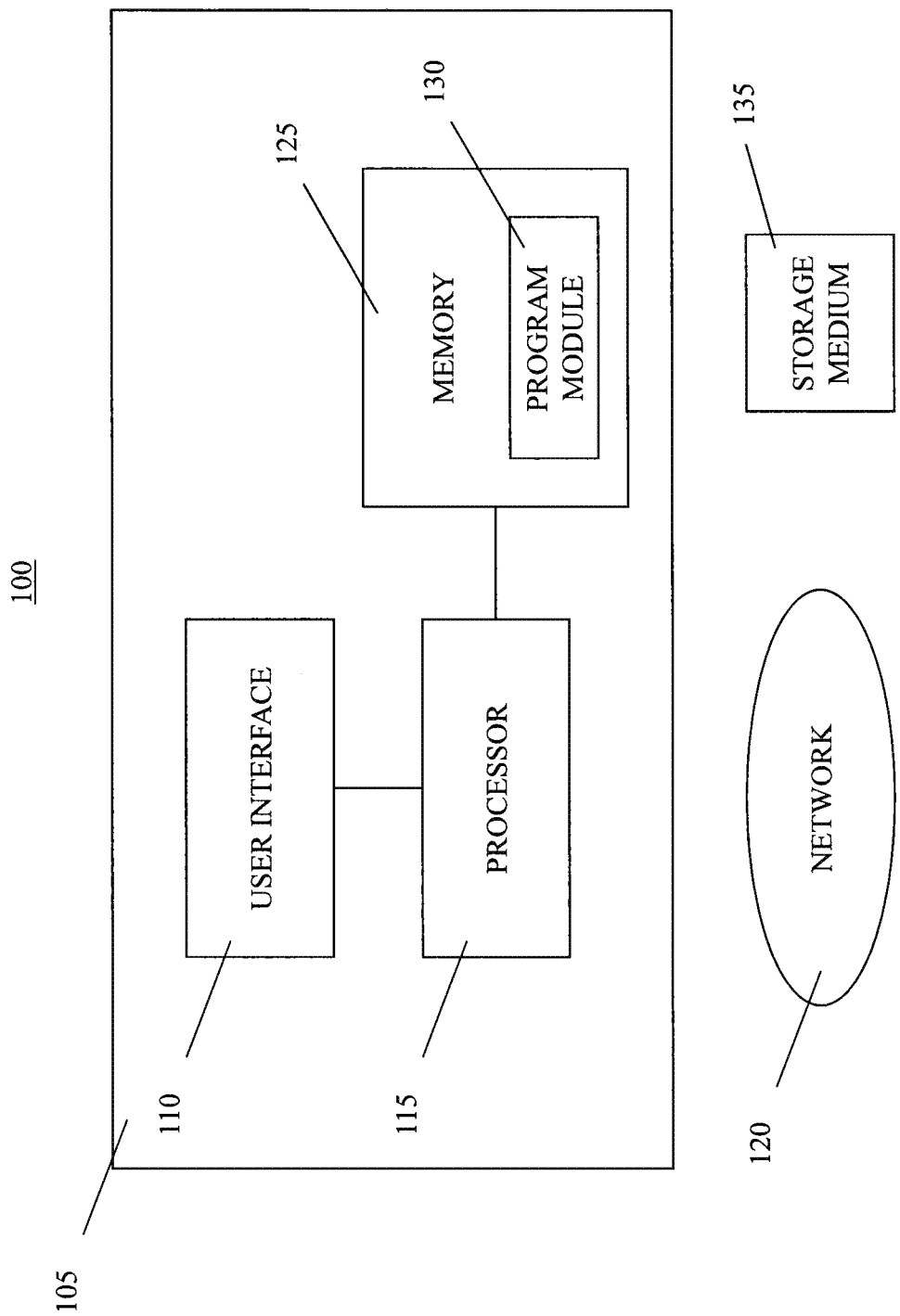
FIG. 1 is a general block diagram of computer apparatus on which the system and method disclosed herein may be implemented.

FIG. 1 is a block diagram of a computer system 100 on which the system and method of the disclosed embodiment can be implemented. System 100 includes a computer 105 coupled to a network 130, e.g., the Internet.

Computer 105 includes a user interface 110, a processor 115, and a memory 120. Computer 105 may be implemented on a general-purpose microcomputer. Although computer 105 is represented herein as a standalone device, it is not limited to such, but instead can be coupled to other devices (not shown in FIG. 1) via network 130.

Processor 115 is configured of logic circuitry that responds to and executes instructions.

Memory 120 stores data and instructions for controlling the operation of processor 115. Memory 120 may be implemented in a random access memory (RAM), a hard drive, a read only memory (ROM), or a combination thereof. One of the components of memory 120 is a program module 125.

Program module 125 contains instructions for controlling processor 115 to execute the methods described herein. The term "module" is used herein to denote a functional operation that may be embodied either as a stand-alone component or as an integrated configuration of a plurality of sub-ordinate components. Thus, program module 125 may be implemented as a single module or as a plurality of modules that operate in cooperation with one another. Moreover, although program module 125 is described herein as being installed in memory 120, and therefore being implemented in software, it could be implemented in any of hardware (e.g., electronic circuitry), firmware, software, or a combination thereof.

User interface 110 includes an input device, such as a keyboard or speech recognition subsystem, for enabling a user to communicate information and command selections to processor 115. User interface 110 also includes an output device such as a display or a printer. A cursor control such as a mouse, track-ball, or joy stick, allows the user to manipulate a cursor on the display for communicating additional information and command selections to processor 115.

Processor 115 outputs, to user interface 110, a result of an execution of the methods described herein. Alternatively, processor 115 could direct the output to a remote device (not shown) via network 130.

While program module 125 is indicated as already loaded into memory 120, it may be configured on a storage medium 135 for subsequent loading into memory 120. Storage medium 135 can be any conventional storage medium that stores program module 125 thereon in tangible form. Examples of storage medium 135 include a floppy disk, a compact disk, a magnetic tape, a read only memory, an optical storage media, universal serial bus (USB) flash drive, a digital versatile disc, or a zip drive. Alternatively, storage medium 135 can be a random access memory, or other type of electronic storage, located on a remote storage system and coupled to computer 105 via network 130.

System 100 can be a CyberPowerPC-Garner Supreme Desktop with an Intel Core i7-8700K processor and 32 GB of RAM. Associated memory may be a NVIDIA GeForce GTX 1070 with a 240 (0.71 B Solid State Drive and a 3 TB hard disc drive. In the disclosed embodiment, software programs that are used are CityEngine 2017.1, a product of Environmental Systems Research Institute, Inc. (ESRI), Python 3.0 and TensorFlow 1.0.

Figure 2:
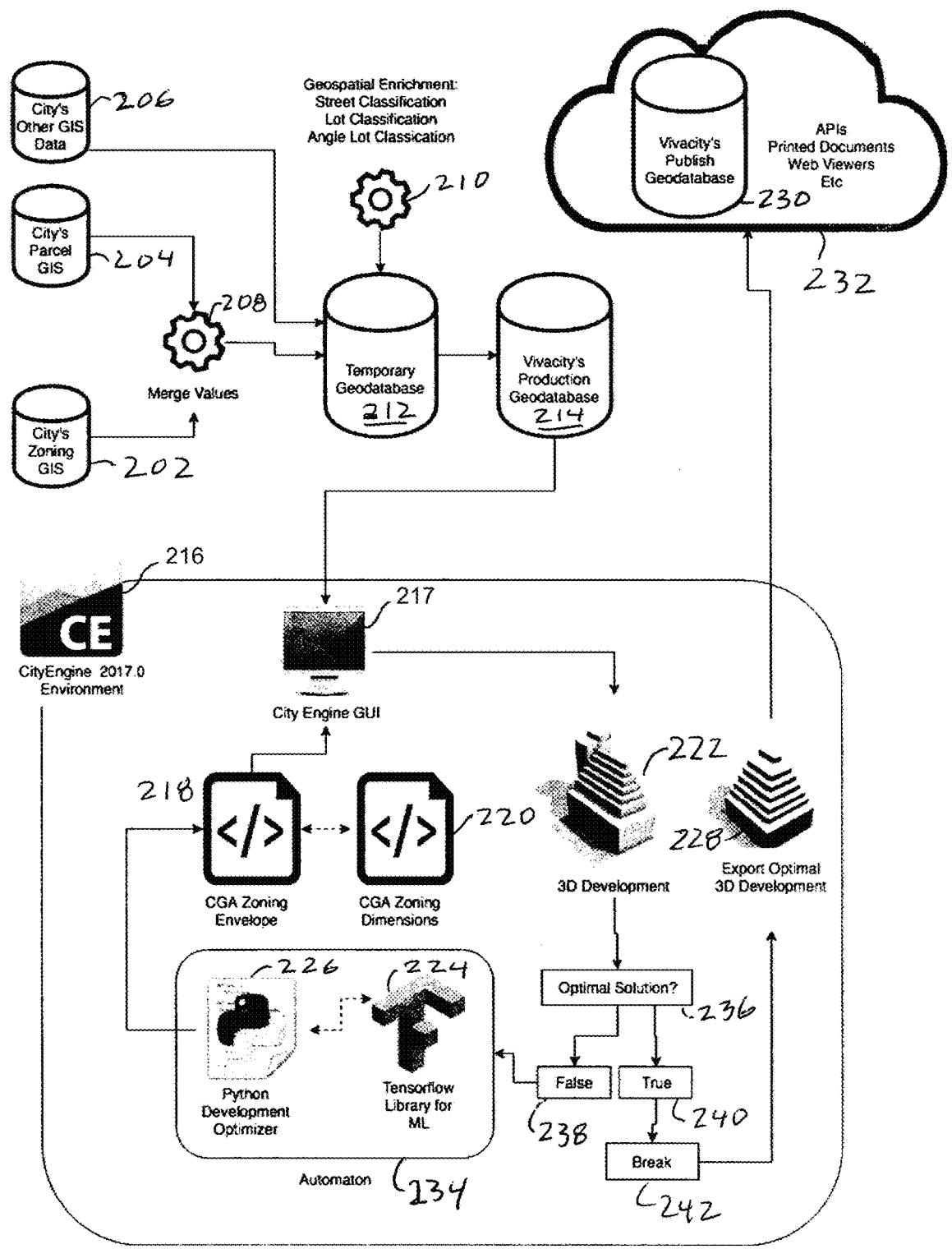
FIG. 2 is an example of workflow for a system in accordance with the disclosure, wherein multiple solutions for meeting zoning regulations for a parcel of land can be implemented.

Referring to FIG. 2, the first step in the workflow 200 of system 100 depends on publicly available data from cities. The workflow relies on cities providing authoritative data sets of the lands parcels and the corresponding zoning designation. Most cities in the United States have this available either via their open data portal or via a request for data from their GIS departments.

In workflow 200, geographic Information System (GIS) data is obtained from the zoning GIS 202, the parcel GIS 204 and other GIS 206 of a city. An alternative for cities that have this information in the form of paper documents is to digitize the information by geospatially defining the documents and developing the data from scratch. Data from the zoning GIS 202 and the parcel GIS 204 may be merged, as represented at 208. The merger can occur via a) an attribute join, where the computer joins attributes data from the zoning GIS data to the parcel of land using a unique identifier or b) a spatial join, where it joins data based on the spatial relationship of the parcel of land in relation to the zoning is layered; usually it is spatially joined if the parcel of land is contained by the zoning GIS polygon.

Geospatial enrichment data including but not limited to street classification, lot classification and angle lot classification is obtained from a geospatial enrichment data source 210. All of the abovementioned data is initially stored in a temporary geodatabase 212. This data is transferred to a production database 214.

Temporary geodatabase 212 and production database 214 have a schema that is used by the Computer Generated Architecture (CGA) code, as described below. The data imported is cleaned and enriched to reflect specific attributes. For example, the New York City zoning has a special attribute for blocks within 100 feet of a street intersection. A preferred schema or dictionary is set forth in Appendix A. A portion of this is a set of strings and a portion is numerical, dimensional data. A computer code file corresponding to this schema is set forth in Appendix B. Appendix B1 contains the field definitions, with some updates, that correspond to schema of Appendix B.

The data in production database 214 is utilized by CityEngine software 216 (for example, version 2017.0). Also used by CityEngine software 216 is the CGA zoning envelope 218 and the CGA zoning dimensions 220, as discussed in more detail below.

The data in production database 214 is imported into CityEngine, a platform that allows for rule base modeling. The data, on a parcel by parcel basis, is combined with two rule-based algorithms that generate the virtual three dimensional development on the parcel following the logic of zoning code designation. This CGA code is composed of two components: a) the CGA Zoning Envelope is a rule-based algorithm that causes the computer to generate generic and repeatable patterns in zoning, and b) the CGA Zoning Dimensions rule-based application of specific dimensions and angles of the parcel following zoning code. The scope of the CGA Zoning Envelope and the CGA Zoning Dimensions varies from city to city depending on the scope of zoning and the legal interpretation that is translated into machine readable code, as set forth in our provisional patent application Ser. No. 62/638,774 filed on Mar. 5, 2018 entitled A RECURRENT NEURAL NETWORK (RNN) SYSTEM AND METHOD THAT INTERPRETS ZONING LEGAL TEXT AND OUTPUTS A SUMMARY, and Ser.

No. 62/639,284, filed on Mar. 6, 2018 having the same title, and co-pending non-provisional application for A LANGUAGE MODEL, METHOD AND APPARATUS FOR INTERPRETING ZONING LEGAL TEXT. These applications are hereby incorporated herein by reference, for all purposes, in their entireties.

For a given parcel of land, the output of the CityEngine software 216 is provided, via a GUI 217 to a three dimensional development engine 222 which produces multiple building configurations that meet the zoning codes for that parcel. Each output is stored as a node in a Tensorflow library 224, as described below. A Python development optimizer 226 utilizes the stored points in Tensorflow 224 to provide an optimal three dimensional development as represented at 228. The optimal three dimensional development is than published to a publish geodatabase 230, which is preferably in the cloud 232.

Tensorflow library 224 and Python development optimizer 226 together provide an automaton 234.

Continuing in the workflow of FIG. 2, multiple solutions for a building that meets the zoning requirements are generated by automaton 234, as described below. At 236, a determination is made as to whether an optimal solution has been generated by automaton 234 in accordance with parcel DNA. If an optimal solution has not been generated as represented at 238, the workflow continues to follow the loop until another solution is generated at 222. Again, a determination is made as to whether an optimal solution has been generated. If an optimal solution has been generated, as represented at 240, processing for additional solutions is terminated at 242. The optimal three dimensional development is exported at 228 to a published database. The data that is generated can be made available on the Internet, streamed to interested parties, printed on paper, or rendered on an electronic display unit (associated with, for example, user interface 110, of computer system 100, of FIG. 1).

Automaton 234 can run on any high-level programming language that supports importing neural network libraries. Python is a common scripting language that supports the attribute manipulation and automated workflows on many three dimensional platforms. Automaton 234 is agnostic to the three dimensional platform that is used, as long as it can access parameters and can issue reports on the three dimensional zoning geometry. Storing of neural nodes is essential for the optimization of the algorithm, in this sense the Tensorflow nodes (described below with reference to FIG. 6) can be rewritten to be implemented in other neural network libraries such as Keras, Deepy or Neupy.

Figure 3:
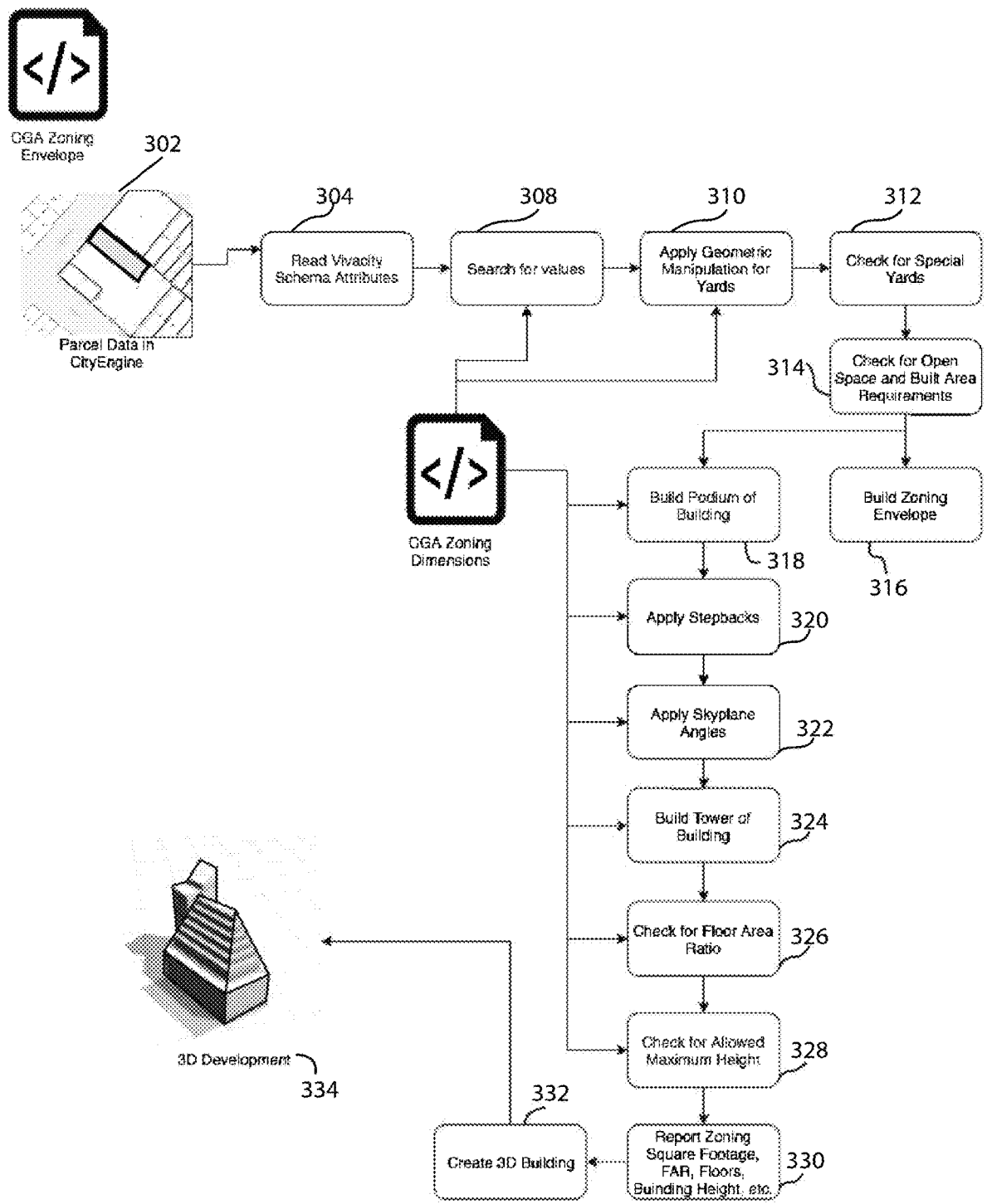
FIG. 3 is a flow chart of the application of zoning rules and dimensions to a parcel of land.
Figure 6:
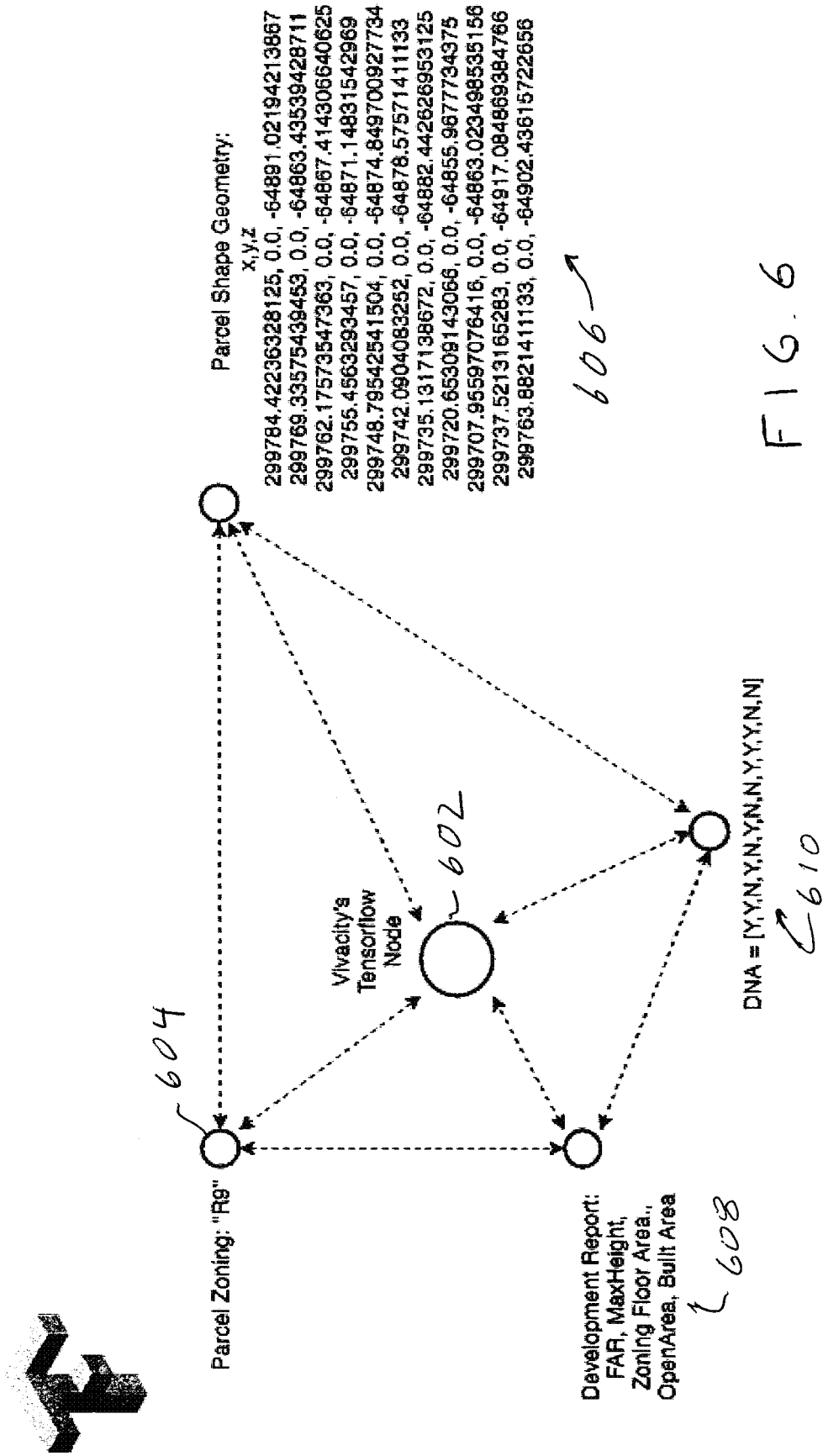
FIG. 6 is an example of information stored in a TensorFlow node in accordance with the embodiment described herein.
Figure 7A:
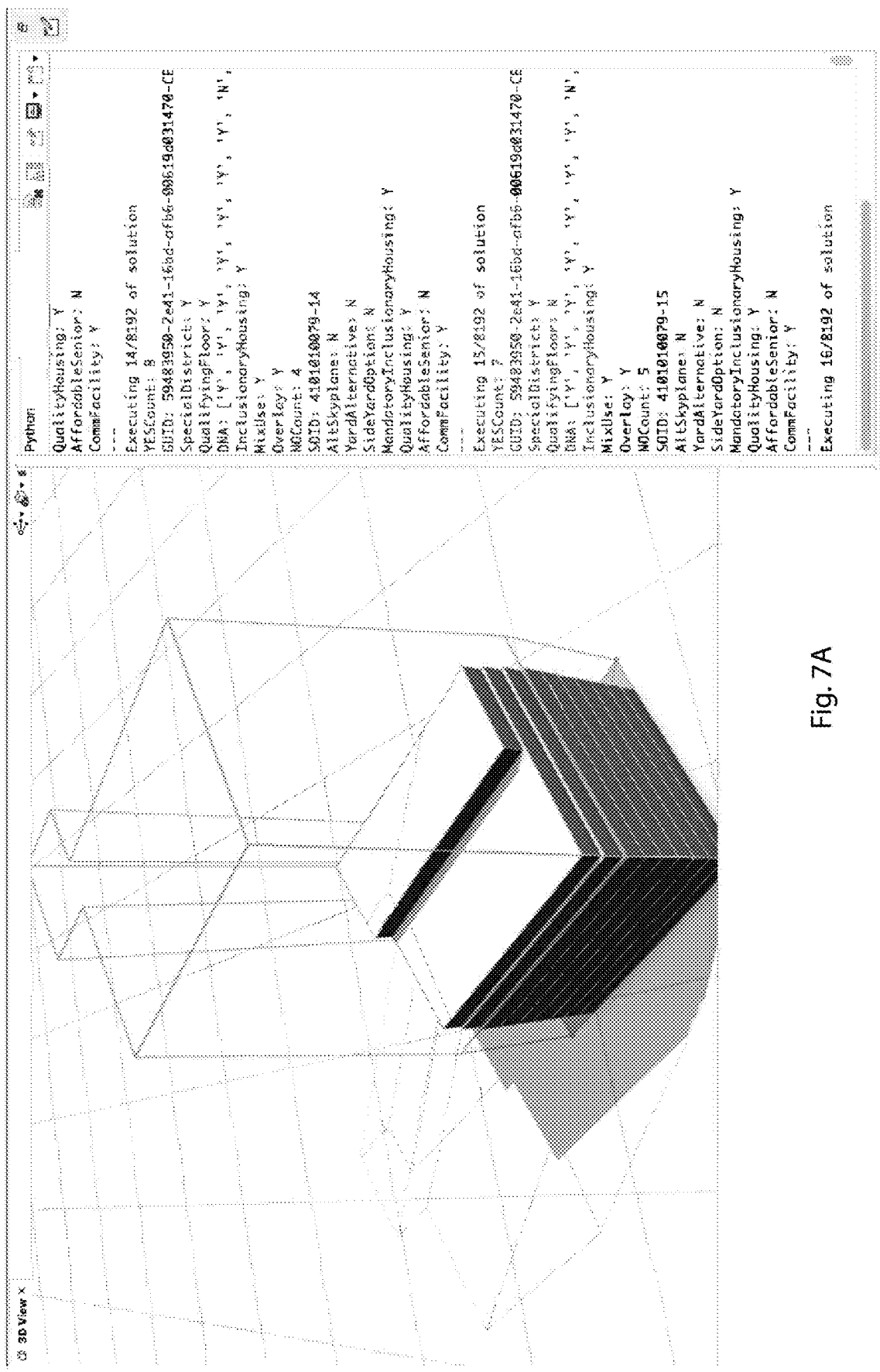
Figure 7B:
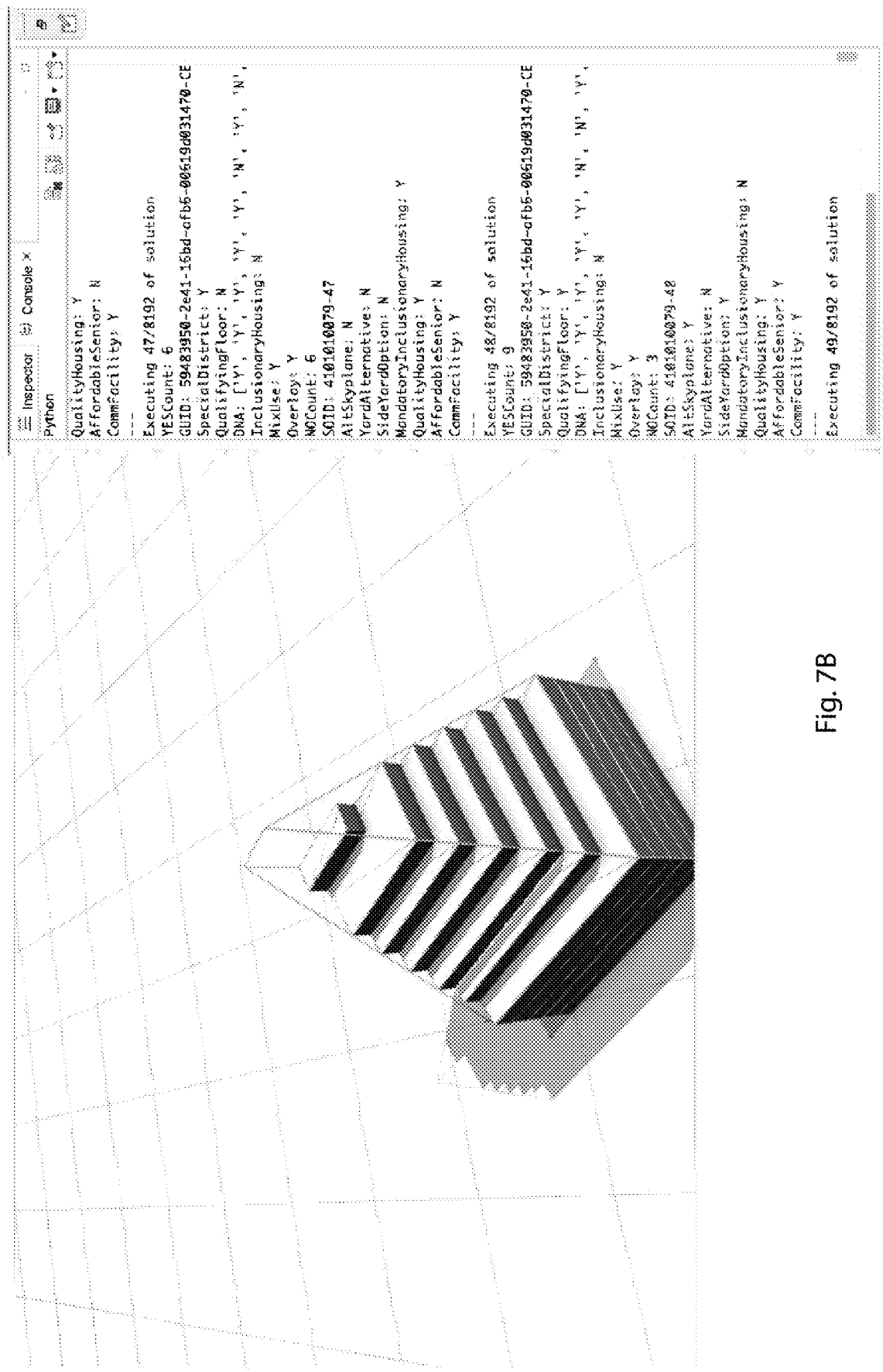
Figure 7C:
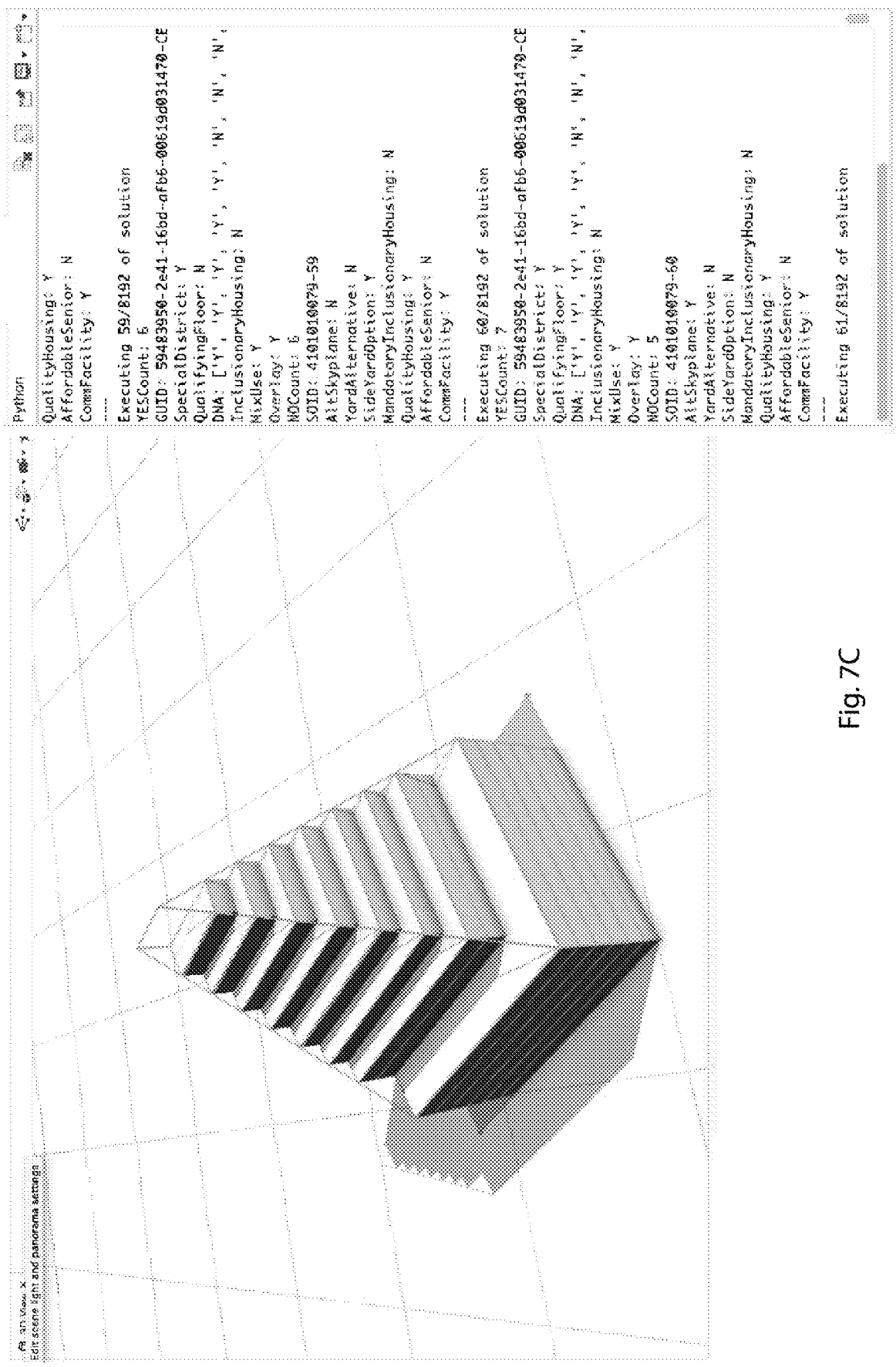

Multiple solutions that meet the zoning criteria are generated in accordance with the description of FIG. 3, and stored in a neural network in accordance with the discussion associated with FIG. 6. The optimal solution is selected in accordance with the procedure discussed below in relation to, for example, FIG. 8A.

FIG. 3 is a flow chart of an example of a rule based zoning hierarchy using the data discussed above. Data 302 for a parcel of land transferred to the CityEngine software 216 (FIG. 2). The schema attributes discussed above for the parcel are read at 304. At 306, a search for values is conducted based on the schema attributes acquired at 304 and CGA zoning dimensions read from 308. At 310, geometric manipulation for yards for the parcel is applied. At 312, a determination is made as to whether there are any special yard requirements for the parcel. At 314, a determination is made as to whether there are open space and built area requirements for the parcel. At 316, the zoning envelope for the building is defined based on the outcomes at 312 and 314.

The following steps are performed in accordance with the CGA zoning dimensions read from 308. At 318, the dimensions of the podium of the building that is to be built are defined. At 320, required setbacks are determined. At 322, skyplane angles are applied. At 324, the structure of the tower of the building is defined. At 326, the floor area ratio (FAR) of the design for the building is determined. At 328, a determination is made as to whether the maximum height of the building meets the zoning requirements. At 330, a report is generated of zoning, square footage, FAR, number of floors, building height, and other relevant parameters. At 332, the reported data is used to render the design of the building. At 334, a representation of the building is created for at least one of distribution, viewing, or storage.

Figures 4A, 4B:
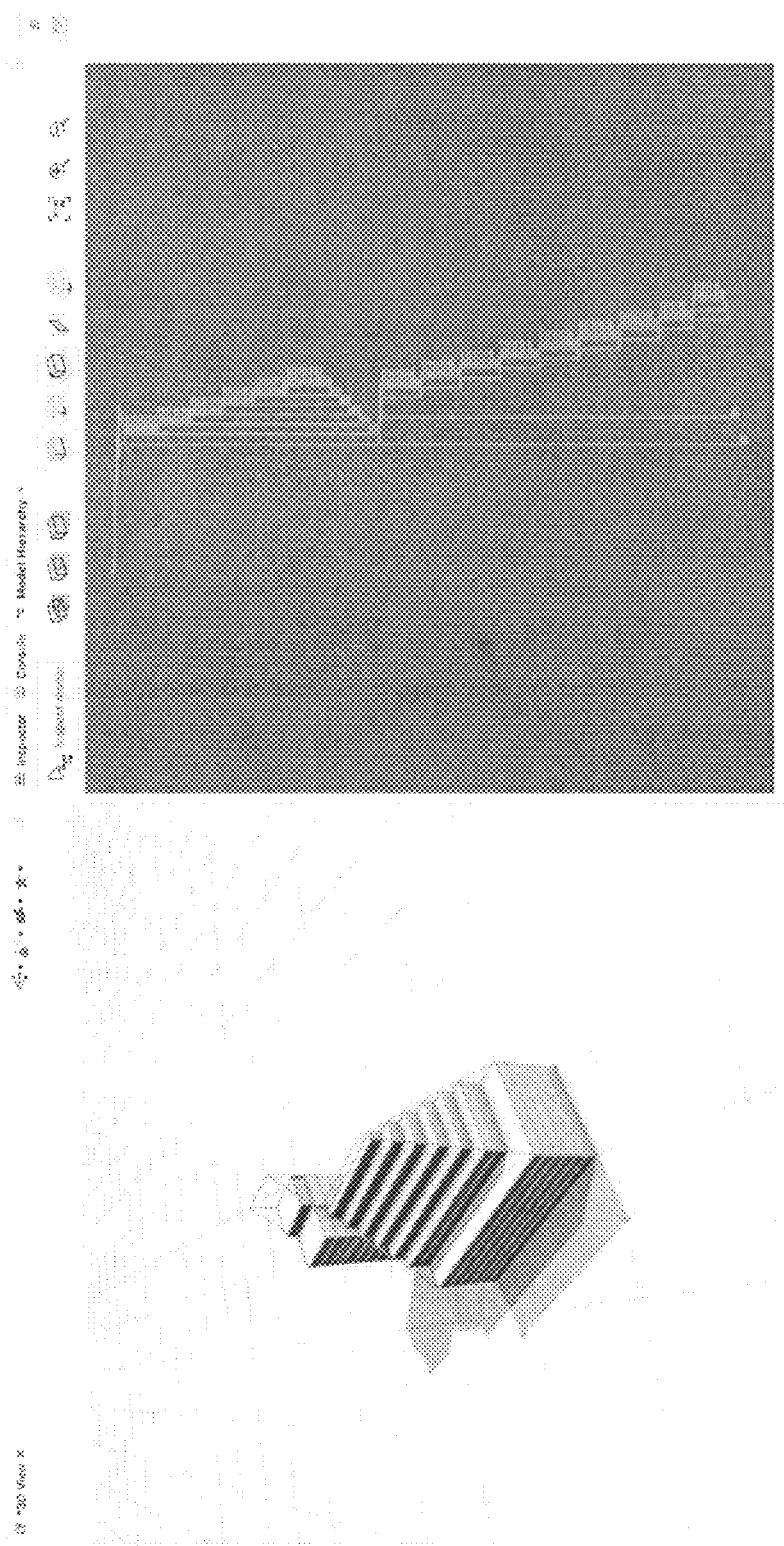
FIG. 4A illustrates an example of a rule based zoning hierarchy using CGA algorithms based on, for example, the flow chart of FIG. 3.
FIG. 4B is an example of a building structure based on the hierarchy of FIG. 4A.

FIG. 4A illustrates an example of a rule based zoning hierarchy using CGA algorithms based on, for example, the flow chart of FIG. 3.

FIG. 4B is an example of a building structure based on the hierarchy of FIG. 4A.

Figure 5:
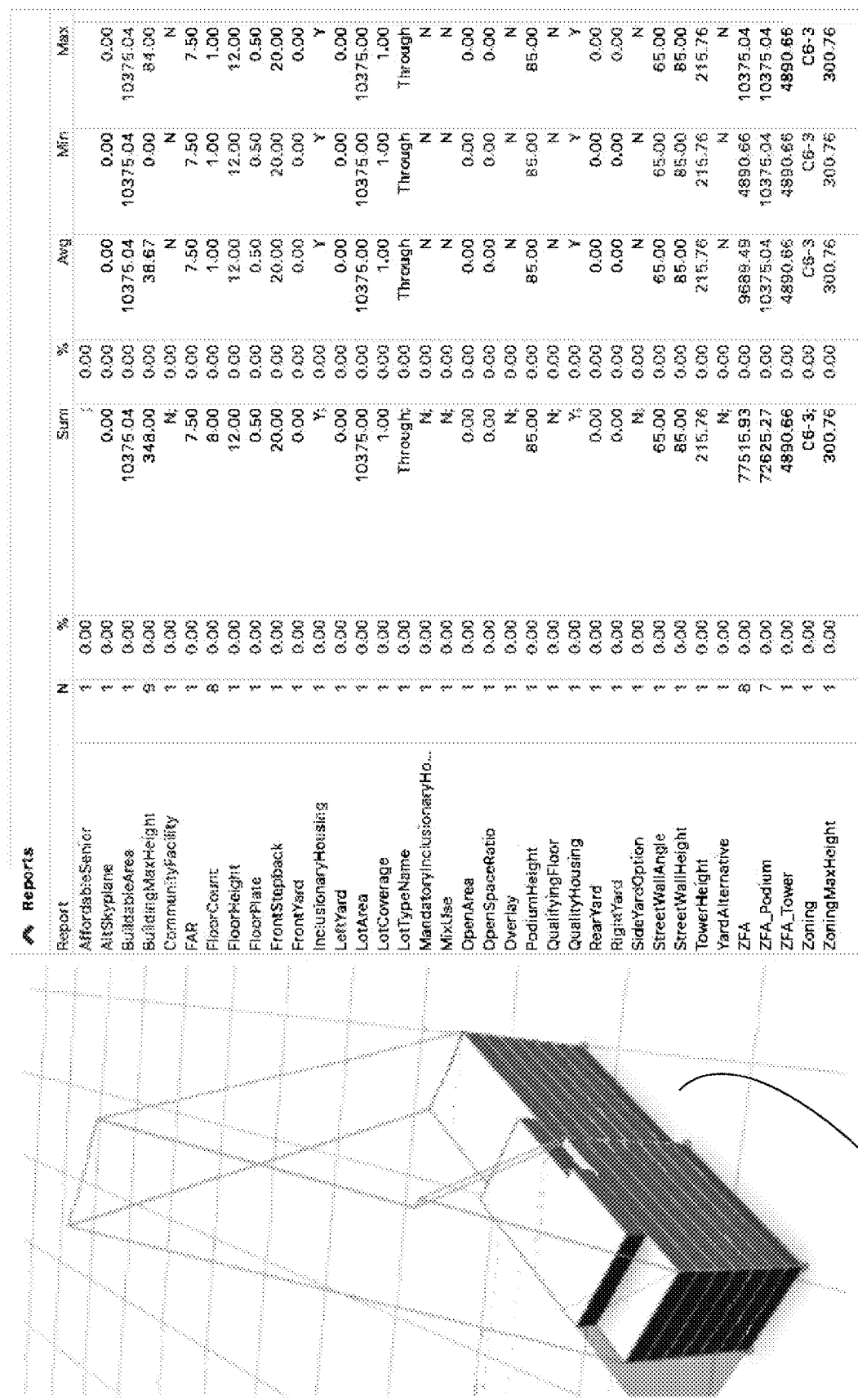
FIG. 5 is an example of a report generated by the CGA Zoning Envelope for New York City.

FIG. 5 is an example of a report generated by the CGA Zoning Envelope for New York City, in accordance with the disclosed embodiment. Numerical data 502 concerning the parcel and one possible design for a building 504 in accordance with the zoning are shown FIG. 6 is an example of information stored in a TensorFlow node 602 in accordance with the embodiment described herein. Information that is stored in the node includes the parcel zoning 604, numerical data for the parcel geometry 606, a development report 608, including, for example, FAR, maximum height, zoning floor area, open area and built area. What is also generated is parcel DNA 610, which is used in connection with, for example, FIG. 8A and its associated description, to facilitate the determination of an optimal building design.

For example, in New York City, the CGA Zoning Envelope includes the following rules: Front Yards, Back Yards, Side Yards, Special Yards, Side Option Yards, Lot Coverage, Open Space Ratios, StreetWall, Setbacks, Skyplane, and Alternate Skyline. In this regard reference is made to Appendix C for an example of computer code that implements a rule.

Another NYC example for the CGA Zoning Dimensions includes the following rules for dimensions: lot coverage percentage; front, rear, and side yard dimensions; dimensions for special yards for corners parcels; street wall height; skyline angles; alternate skyline angles; podium building heights; tower building heights; tower setbacks and stepbacks; floor heights; floor plate height; FAR; open space ratio; maximum height; allowable units; and required parking units.

As shown in FIGS. 7A, 7B, 7C and 7D, CGA Zoning Envelope reports are parametrically generated as a result of the virtual three dimensional development. For each parcel, a report is generated, which includes, but is not limited to the following: Zoning Designation, special conditions (Overlay, Inclusionary Housing, Mandatory Inclusionary Housing, etc.), FAR, Lot Area, Buildable Area, Open Area, Lot Type, Building Max Height, Zoning Maximum Height, Street Wall Height, Skyplane Angle, and Zoning Floor Area.

In the implementation of the algorithms, the CGA Zoning Envelope Geometry generation is parametrically and dynamically generated using the dimensions from the CGA Zoning Dimensions. An example of the computer code representative of the zoning dimensions is contained in Appendix D. These change dynamically depending on how different parameters are applied. The first parameter that affects the rest of the parameters is the Zoning Designation. If a Zoning Designation is changed for a parcel, all corresponding parameters that accompany that Zoning Designation change as well. For example if a parcel has the option of being a C5-2 or an R10, if zoning designation C5-2 is applied, then FAR becomes 6.0 and the maximum height becomes 300 feet; but if the zoning designation of R10 is applied to the parcel, the FAR becomes 10, the maximum height becomes 1700 feet and only a Special Yard Option needs to be applied. But within one zoning designation there can be multiple options that can also be legally applied to the parcel. This presents a problem where a parcel often has an n-number of possibilities determined by what can be applied and hence the maximum development cannot be immediately discovered unless the full matrix of n-number of possibilities is explored.

In order to identify the maximum potential for a parcel, the two CGA algorithms are controlled by a third algorithm running on a Python extension. The Python algorithm first establishes what is the full n-number of solutions per parcel; then it proceeds, through a process of brute force computation, to apply all possible solutions to a parcel. For each parcel, the Python algorithm applies the different parameters to the attributes driving the CGA Zoning Envelope algorithm and saves in memory the report output and the three dimensional object. The Python algorithm also saves a "Parcel DNA", which is concatenated string for the attributes applied to the parcel, for each of the elements in the matrix. Once the parcel solution space is exhausted for each parcel, the Python algorithm queries the pool of solutions to find the development with the highest amount of zoning floor area, highest FAR, highest number of floors, with the least amount of regulations. The optimal solution is saved on a new geo-database, the Optimal Solution Geodatabase, with the same proprietary schema, storing solely for the optimal solution with its original attributes, new attributes driving the three dimensional development, buildable metrics reports, and the "Parcel DNA". The "Parcel DNA" along with the Zoning Designation, the Zoning Use (Residential, Commercial, Manufacturing, Mix Use, etc.) and the Lot Type (Interior Lot, Through Lot, Corner Lot, etc.) are in addition stored into a neural network as a an evolutionary node in Tensorflow, as described above with reference to FIG. 6. For every new parcel that the Python algorithm explores, the node acts a memory holder for the parameters that gave the previous pool of parcels the maximum development in three dimensions. The node acts as a seed and reduces the n-number possibilities that the Python algorithm needs to explore when it moves to a new parcel. As a consequence, the algorithm improves its performance over time as it explores more and more parcels. Thus, possibilities are eliminated as more parameters are calculated and other possibilities get pushed down, as being less than optimum in, for example, FIG. 8A.

The CGA code is very suitable in being able to both manipulate three dimensional objects following a city's zoning law and being able to dynamically apply corresponding zoning attribute values to parametrically change the geometry (for example, maximum height, skyline angle, etc.) There are other three dimensional geometry programmable languages such as, for example, RhinoScript, RhinoPython, and SketchUp Ruby, where the CGA code can be rewritten to follow the same geometric manipulation logic, but the logic ultimately will still be the same. CGA has advantages in its ability to quickly render the geometric manipulation and in the capacity to generate reports on the fly.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof

What is claimed is:

1. A computerized method for parametrically creating a buildable envelope on a parcel of land, comprising:
   obtaining zoning information for a city;
   storing the information in a database;
   using information in the database on a platform for rule based modeling to generate a virtual three dimensional development solution on the parcel of land that follows the logic of a zoning code designation;
   establishing a pool of the full number of development solutions for each parcel that meets the zoning code;
   querying the pool of solutions to find an optimal development solution;
   storing a concatenated string for attributes applied to the parcel, and
   storing as an evolutionary node in a neural network the zoning designation for the parcel, attributes applied to the parcel, the classification of the parcel and a report of the optimal development solution with original attributes;
   wherein a matrix of parameters of the attributes of possible solutions constitutes a DNA for a parcel that is stored in the memory.

2. A computerized method for parametrically creating a buildable envelope on a parcel of land, comprising:
   obtaining zoning information for a city;
   storing the information in a database;
   using information in the database on a platform for rule based modeling to generate a virtual three dimensional development solution on the parcel of land that follows the logic of a zoning code designation;
   establishing a pool of the full number of development solutions for each parcel that meets the zoning code;
   querying the pool of solutions to find an optimal development solution;
   storing a concatenated string for attributes applied to the parcel, and
   storing as an evolutionary node in a neural network the zoning designation for the parcel, attributes applied to the parcel, the classification of the parcel and a report of the optimal development solution with original attributes;

wherein the optimal development solution comprises a solution with the largest amount of zoning floor area, largest floor-area-ratio, largest number of floors, and the smallest number of regulations.

3. A computerized method for parametrically creating a buildable envelope on a parcel of land, comprising:
obtaining zoning information for a city;
storing the information in a database;
using information in the database on a platform for rule based modeling to generate a virtual three dimensional development solution on the parcel of land that follows the logic of a zoning code designation;
establishing a pool of the full number of development solutions for each parcel that meets the zoning code;
querying the pool of solutions to find an optimal development solution;
storing a concatenated string for attributes applied to the parcel,
storing as an evolutionary node in a neural network the zoning designation for the parcel, attributes applied to the parcel, the classification of the parcel and a report of the optimal development solution with original attributes; and
parametrically creating a buildable envelope for additional parcels of land, by optimizing searching by the neural network learning from past categorizations of parcels previously stored as evolutionary nodes.

4. The method of claim 3, wherein buildable envelopes for the additional parcels of land comprising those for a portion of a city, or an entire city.

5. A computerized method for parametrically creating a buildable envelope on a parcel of land, comprising:
obtaining zoning information for a city;
storing the information in a database;
using information in the database on a platform for rule based modeling to generate a virtual three dimensional development solution on the parcel of land that follows the logic of a zoning code designation;
establishing a pool of the full number of development solutions for each parcel that meets the zoning code;
querying the pool of solutions to find an optimal development solution;
storing a concatenated string for attributes applied to the parcel, and
storing as an evolutionary node in a neural network the zoning designation for the parcel, attributes applied to the parcel, the classification of the parcel and a report of the optimal development solution with original attributes; wherein the rule based modeling comprises:
generating generic and repeatable patterns in zoning, and
applying specific dimensions and angles of the parcel of land following the zoning information of the city.

6. The method of claim 5, further comprising:
establishing a full number of possible solutions for the parcel of land;
applying different parameters to the attributes of the parcel of land;
computing all possible solutions for the parcel of land; and
storing in a memory a report and data representative of the corresponding three dimensional object for each solution.

7. The method of claim 6, further comprising storing a concatenated string for the attributes applied to the parcel.

8. A computerized method for parametrically creating a buildable envelope on a parcel of land, comprising:
obtaining zoning information for a city;
storing the information in a database;
using information in the database on a platform for rule based modeling to generate a virtual three dimensional development solution on the parcel of land that follows the logic of a zoning code designation;
establishing a pool of the full number of development solutions for each parcel that meets the zoning code;
querying the pool of solutions to find an optimal development solution;
storing a concatenated string for attributes applied to the parcel, and
storing as an evolutionary node in a neural network the zoning designation for the parcel, attributes applied to the parcel, the classification of the parcel and a report of the optimal development solution with original attributes; and
for storing for additional parcels of land, additional evolutionary nodes in the neural network.

9. The method of claim 8, further comprising using the nodes as memory holders for parameters that gave parcels optimum development in three dimensions.

10. A computerized method for parametrically creating a buildable envelope on a parcel of land, comprising:
obtaining zoning information for a city;
storing the information in a database;
using information in the database on a platform for rule based modeling to generate a virtual three dimensional development solution on the parcel of land that follows the logic of a zoning code designation;
establishing a pool of the full number of development solutions for each parcel that meets the zoning code;
querying the pool of solutions to find an optimal development solution;
storing a concatenated string for attributes applied to the parcel, and
storing as an evolutionary node in a neural network the zoning designation for the parcel, attributes applied to the parcel, the classification of the parcel and a report of the optimal development solution with original attributes;
wherein the rule based modeling comprises:
obtaining schema attributes for the parcel;
searching for parameter values based on the schema attributes and zoning dimensions;
applying geometric manipulation to yards associated with the parcel;
determining whether there are special yard requirements for the parcel;
determining a presence of any open space or built area requirements for the parcel; and
defining a zoning envelope for a building on the parcel based on the yard requirements, the open space requirements and built area requirements.

11. The method of claim 10, further comprising:
defining dimensions of a podium of a building to be built on the parcel;
determining setbacks of the building;
applying skyplane angles to the building;
determining a floor to area ratio of the building;
ascertain whether a maximum height of the building meets zoning requirements;

generating a report of parameters including at least zoning, square footage, floor area ratio, number of floors, and building height; and using the report to render a design of the building.

12. The method of claim 11, further comprising:

defining a structure for a tower of the building; and using parameters of the tower in generating the report.

13. The method of claim 11, further comprising creating a representation of the building for at least one of distribution, viewing and storage.

14. A computerized method for parametrically creating a buildable envelope on a parcel of land, comprising:

obtaining zoning information for a city;

storing the information in a database;

using information in the database on a platform for rule based modeling to generate a virtual three dimensional development solution on the parcel of land that follows the logic of a zoning code designation;

establishing a pool of the full number of development solutions for each parcel that meets the zoning code;

querying the pool of solutions to find an optimal development solution;

storing a concatenated string for attributes applied to the parcel, and storing as an evolutionary node in a neural network the zoning designation for the parcel, attributes applied to the parcel, the classification of the parcel and a report of the optimal development solution with original attributes;

wherein the rule based modeling further comprises translating a legal interpretation of the zoning information into machine readable code.

15. A computerized system for parametrically creating a buildable envelope on a parcel of land comprising:

a processor;

a memory containing instructions for causing the processor to execute a method comprising:

obtaining zoning information for a city;

storing the information in a database;

using information in the database on a platform for rule based modeling to generate a virtual three dimensional development solution on the parcel of land that follows the logic of a zoning code designation;

establishing a pool of the full number of development solutions for each parcel that meet the zoning code;

querying the pool of solutions to find an optimal development solution;

storing a concatenated string for attributes applied to the parcel, and storing as an evolutionary node in a neural network the zoning designation for the parcel, attributes applied to the parcel, the classification of the parcel and a report of the optimal development solution with original attributes;

wherein a matrix of parameters of the attributes of possible solutions constitutes a DNA for a parcel that is stored in the memory.

16. A computer readable non-transitory storage medium storing instructions of a computer program which, when executed by a computer system having a processor results in performance of a method for analyzing a zoning code, comprising:

obtaining zoning information for a city;

storing the information in a database;

using information in the database on a platform for rule based modeling to generate a virtual three dimensional development solution on the parcel of land that follows the logic of a zoning code designation;

establishing a pool of the full number of development solutions for each parcel that meet the zoning code;

querying the pool of solutions to find an optimal development solution;

storing a concatenated string for attributes applied to the parcel, and storing as an evolutionary node in a neural network the zoning designation for the parcel, attributes applied to the parcel, the classification of the parcel and a report of the optimal development solution with original attributes;

wherein a matrix of parameters of the attributes of possible solutions constitutes a DNA for a parcel that is stored in the memory.

* * * * *